(12) United States Patent
Kim et al.

(10) Patent No.: US 12,451,772 B2
(45) Date of Patent: Oct. 21, 2025

(54) COMPOSITE OIL SEAL HAVING ELECTRIC CORROSION PREVENTION FUNCTION AND METHOD OF MANUFACTURING GROUND PATH THEREOF

(71) Applicant: PYUNGHWA OIL SEAL INDUSTRY CO., LTD., Daegu (KR)

(72) Inventors: Taehyung Kim, Daegu (KR); Eunmin Park, Daegu (KR); Jaehyuk Sung, Daegu (KR)

(73) Assignee: PYUNGHWA OIL SEAL INDUSTRY CO., LTD., Daegu (KR)

( * ) Notice: Subject to any disclaimer, the term of this patent is extended or adjusted under 35 U.S.C. 154(b) by 358 days.

(21) Appl. No.: 18/110,147

(22) Filed: Feb. 15, 2023

(65) Prior Publication Data
US 2023/0412053 A1    Dec. 21, 2023

(30) Foreign Application Priority Data

May 26, 2022  (KR) .......................... 10-2022-0065018
Nov. 9, 2022   (KR) .......................... 10-2022-0149040
Dec. 30, 2022  (KR) .......................... 10-2022-0190765

(51) Int. Cl.
*H02K 11/40*    (2016.01)
*D03D 15/275*   (2021.01)
*D04H 3/011*    (2012.01)
*H02K 5/10*     (2006.01)
*H02K 5/22*     (2006.01)

(52) U.S. Cl.
CPC ............ *H02K 11/40* (2016.01); *D03D 15/275* (2021.01); *D04H 3/011* (2013.01); *H02K 5/10* (2013.01); *H02K 5/225* (2013.01)

(58) Field of Classification Search
CPC .......... H02K 11/40; H02K 4/10; H02K 4/225; D03D 15/275; D04H 3/011; F16J 15/3204; F16J 15/3232; F16J 15/3248; F16J 15/3252

See application file for complete search history.

(56) References Cited

U.S. PATENT DOCUMENTS

2021/0180698 A1*  6/2021  Wagner ................ F16J 15/3252

FOREIGN PATENT DOCUMENTS

| CN | 111615604 A | * | 9/2020 | ............ F16J 15/064 |
| DE | 102013000982 A1 | * | 7/2014 | ............ F16J 15/002 |
| DE | 102019119317 A1 | * | 1/2021 | ......... F16C 33/7856 |
| JP | H07-229046 A | | 8/1995 | |
| JP | 2000509903 A | * | 8/2000 | |

(Continued)

OTHER PUBLICATIONS

Translation of CN111615604 (Year: 2025).*

(Continued)

*Primary Examiner* — Gilbert Y Lee
(74) *Attorney, Agent, or Firm* — Paratus Law Group, PLLC

(57) ABSTRACT

There is provided a composite oil seal having an electric corrosion prevention function. The composite oil seal includes: a seal main body configured to seal an interior of a motor housing in a state of being mounted to a shaft in the motor housing; and a ground path mounted to the seal main body. The ground path is configured to electrically connect the shaft to the motor housing to allow current induced in the shaft to flow to the motor housing. ( )

11 Claims, 15 Drawing Sheets

(56) References Cited

FOREIGN PATENT DOCUMENTS

JP          6693812 B2    5/2020
KR   10-2008-0062370 A    7/2008

OTHER PUBLICATIONS

Translation of DE102013000982 (Year: 2025).*
Translation of DE102019119317 (Year: 2025).*
Translation of JP2000509903 (Year: 2025).*
Korean Office Action for related KR Application No. 10-2022-0065018 mailed Apr. 29, 2024 from Korean Intellectual Property Office.
Korean Office Action for related KR Application No. 10-2022-0190765 mailed Aug. 28, 2024 from Korean Intellectual Property Office.

* cited by examiner

COMPOSITE OIL SEAL HAVING ELECTRIC CORROSION PREVENTION FUNCTION AND METHOD OF MANUFACTURING GROUND PATH THEREOF

CROSS-REFERENCE TO PRIOR APPLICATIONS

This application claims priority to Korean Patent Application Nos. 10-2022-0065018 (filed on May 26, 2022), 10-2022-0149040 (filed on Nov. 9, 2022), and 10-2022-0190765 (filed on Dec. 30, 2022), which are all hereby incorporated by reference in their entirety.

BACKGROUND

The present invention relates to an oil seal mounted in a motor, and more particularly to a composite oil seal having an electric corrosion prevention function, which prevents electric corrosion of a bearing by transmitting current induced in a shaft of the motor to a motor housing and allowing the current to flow to the ground, and a method of manufacturing a ground path of the composite oil seal.

A driving motor, which is used as a power source for electric vehicles or hybrid vehicles, basically includes a motor housing, a stator, and a rotor. The rotor has a shaft extending along a central axis thereof, and a wire is wound around the shaft. The shaft is supported by a bearing, and extends to the outside of the motor housing to output rotational force.

Meanwhile, in the case of a driving motor configured to operate using a frequency conversion scheme due to switching of an inverter, current is induced in a shaft during operation thereof. The current induced in the shaft is discharged to the ground through a bearing. At this time, a micro-arc is generated in the bearing, which causes damage to the surface of the bearing. If this phenomenon is repeated, a lubricant film of the bearing is destroyed, and scratches are increased on the surface of the bearing, leading to loss of function of the bearing. The above problem is more serious in the case of high-capacity and high-torque driving motors.

In order to solve the above problem, a technique of mounting a ground ring for conductively connecting a shaft to a motor housing between the shaft and the motor housing has been developed.

However, the conventional ground ring is very expensive in spite of its relatively simple configuration. Particularly, there is an inconvenience in that it is necessary to form female screw holes in the motor housing in order to mount the ground ring to the motor housing. That is, it is necessary to drill a plurality of holes in the motor housing and to tap a female thread in each of the drilled holes. Therefore, when mounting one ground ring, a drilling device and a tapping device are required, and it is also troublesome since a process of fastening bolts should be performed.

In particular, cutting chips are inevitably generated during the tapping process. If fine cutting chips enter a bearing, serious scratches occur on bearing balls as well as outer and inner rings. This causes a problem that the motor must be disassembled in order to replace the bearing.

SUMMARY

The present invention has been made to solve the above problems, and it is an object of the present invention to provide a composite oil seal having an electric corrosion prevention function, which transmits current induced in a shaft to the outside while performing a basic sealing function, thereby preventing damage to a bearing, preventing electrical defects of a motor, and increasing the lifespan of the motor.

In addition, it is another object of the present invention to provide a composite oil seal having an electric corrosion prevention function, which may be used semi-permanently and may be easy and convenient to use since it is not necessary to machine a motor housing in order to mount the oil seal.

A composite oil seal having an electric corrosion prevention function according to the present invention for accomplishing the above and other objects includes a seal main body configured to seal an interior of a motor housing in the state of being mounted to a shaft in the motor housing and a ground path mounted to the seal main body and configured to electrically connect the shaft to the motor housing to allow current induced in the shaft to flow to the motor housing.

The ground path may be made of a conductive fabric having a woven structure.

The conductive fabric may include a carbon fiber sheet and may be adhesively fixed to the seal main body.

The ground path may be made of a non-woven fabric impregnated with a conductive material.

The conductive material may include any one of nickel, copper, silver, and aluminum.

The composite oil seal may further include a support member configured to detachably fix the ground path to the seal main body.

The seal main body may have a mounting groove formed therein, and the support member may include a support detachably mounted in the mounting groove, an arm fixed to the support, and a support case located at an end of the arm to accommodate and support the ground path.

A composite oil seal having an electric corrosion prevention function according to another aspect of the present invention includes a seal main body configured to seal an interior of a motor housing in the state of being mounted to a shaft in the motor housing and a ground path mounted to the seal main body and configured to electrically connect the shaft to the motor housing to allow current induced in the shaft to flow to the motor housing, wherein the ground path includes a conductive layer in which a conductive thread having a yarn shape and made of a conductive material is patterned. The conductive layer includes at least two conductive layers stacked one above another, and the at least two conductive layers include a first conductive layer formed in such a manner that a first conductive thread is wound in a circumferential direction about the center of the seal main body and a second conductive layer formed in such a manner that a second conductive thread extends in a radial direction about the center of the seal main body so as to intersect the first conductive thread, the second conductive layer being in contact with the first conductive layer.

The ground path may further include a fixing sheet configured to be adhered to the seal main body and a fixing thread fixing the conductive layer to the fixing sheet.

The conductive thread may have a diameter of 0.1 to 2 mm, and may be used as any one of an upper thread and a lower thread for use in a sewing machine, and the fixing thread may be formed in the same pattern as the conductive thread, may be used as the remaining one of the upper thread and the lower thread for use in the sewing machine, and may be sewn together with the conductive thread to fix the conductive thread to the fixing sheet.

The fixing thread may pass through both sides of the fixing sheet along the conductive thread so as to be alternately located on one side and the other side of the fixing sheet, and a portion of the fixing thread that is located on one side of the fixing sheet may cross and press the upper surface of the conductive thread to fix the conductive thread.

The fixing sheet may be made of a fiber material, and may be coated with a conductive spray.

The first conductive layer may be formed in such a manner that the first conductive thread is continuously wound in a spiral shape in the circumferential direction about the center of the seal main body, and the second conductive layer may be continuously formed in a wave shape such that two adjacent sections thereof cross the first conductive thread of the first conductive layer in parallel with each other.

The conductive thread may be made of a carbon fiber material.

According to another aspect of the present invention, a method of fixing a conductive layer to a fixing sheet of the composite oil seal having an electric corrosion prevention function includes loading the fixing thread on a sewing machine as one of an upper thread and a lower thread and fixing the conductive thread by sewing the conductive thread and the fixing thread to the fixing sheet using the sewing machine.

In the fixing the conductive thread, the conductive thread may be fixed by stitching the fixing thread through the fixing sheet.

The fixing the conductive thread may include stitching the fixing thread through the fixing sheet to fix the first conductive layer to the fixing sheet while winding the first conductive thread in the circumferential direction about the center of the seal main body and stitching the fixing thread through the fixing sheet to fix the second conductive layer to the fixing sheet while forming the second conductive thread on the upper surface of the first conductive layer in a wave shape in the radial direction about the center of the seal main body such that the second conductive thread crosses the first conductive thread.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION

Hereinafter, an exemplary embodiment of the present invention will be described in detail with reference to the accompanying drawings.

A composite oil seal according to an embodiment may perform both an oil-sealing function and a grounding function for discharging current induced in a shaft to a motor housing, thereby preventing damage to a bearing due to static electricity.

Such a composite oil seal is realized merely by adding a ground path to an oil seal, which is essentially mounted in a motor. Therefore, it is possible to completely resolve inconveniences in mounting a conventional ground ring. In particular, since the ground path is formed by cutting a fiber fabric and is attached to the oil seal, the ground path may be used irrespective of the diameter of the shaft or a gap between the shaft and an inner circumferential surface of a motor housing. Because the inner diameter of the conventional ground ring is not adjusted, the conventional ground ring has poor versatility. That is, if the conventional ground ring does not fit the specifications of the shaft, it is impossible to mount the same to the shaft.

Figure 1:
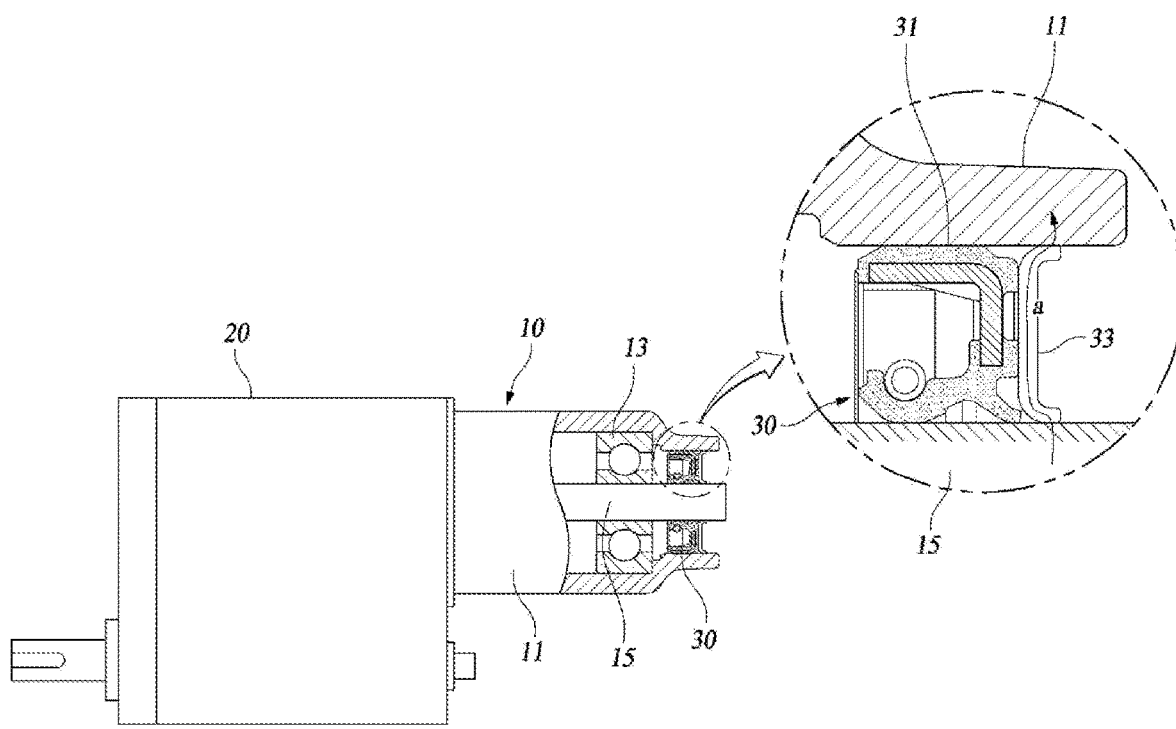
FIG. 1 is a view showing a motor to which a composite oil seal having an electric corrosion prevention function according to an embodiment of the present invention is applied.
Figure 2:
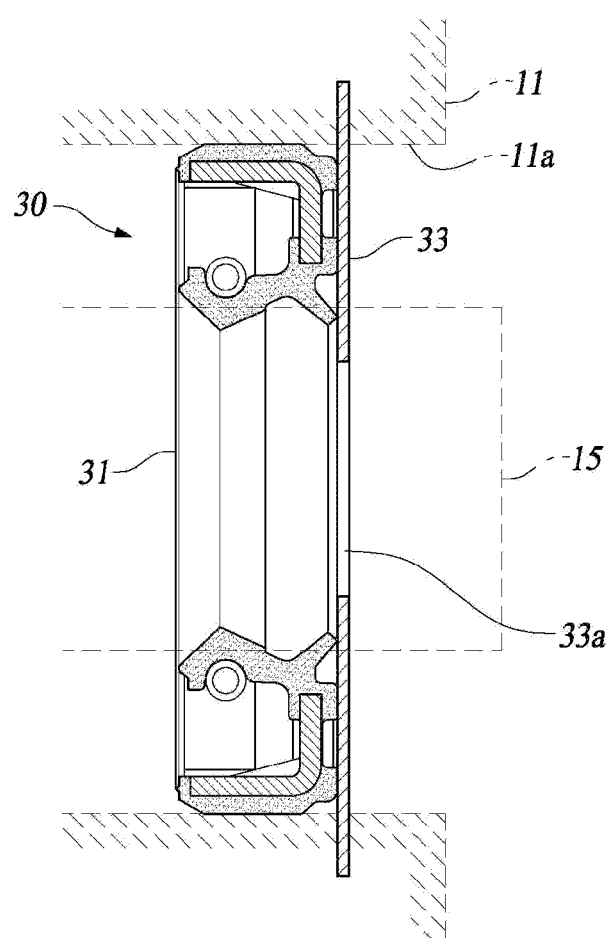
FIG. 2 is a cross-sectional view of the composite oil seal shown in FIG. 1.

FIG. 1 is a view showing a motor 10 to which a composite oil seal 30 having an electric corrosion prevention function according to an embodiment of the present invention is applied, and FIG. 2 is a cross-sectional view of the composite oil seal shown in FIG. 1.

As shown in the drawings, a shaft 15 is mounted in a motor housing 11 constituting the motor 10. The shaft 15 rotates in the state of being supported by a bearing 13 and transmits rotational torque to a reducer 20. One end portion of the shaft 15 extends so as to be exposed to the outside of the motor housing 11.

In addition, the composite oil seal 30 is located beside the bearing 13. The composite oil seal 30 includes a seal main body 31 and a ground path 33. The seal main body 31 basically serves to seal a gap between the motor housing 11 and the shaft to prevent external foreign substances from being introduced into the motor housing. The seal main body 31 has the same configuration and performs the same function as a general hermetic seal configured to be mounted in an electric motor.

The ground path 33 functions to transmit electricity remaining in the shaft 15 in a direction indicated by the arrow a to discharge the electricity to the motor housing 11. As described above, if electricity remains in the shaft 15, the electricity leaks to the bearing 13 and thus causes the occurrence of arc, leading to damage to the bearing 13.

The ground path 33 may be fixed to the seal main body 31 in a bonding manner. This means that the ground path 33 is capable of being applied to any of various general hermetic seals. It is possible to use a hermetic seal having only a sealing function not only as a general sealing element but also as a grounding element exhibiting a greatly improved grounding function merely by attaching the ground path to the hermetic seal.

The ground path 33 is manufactured by cutting a woven fabric or a non-woven fabric made of conductive fibers. The shape or size of the ground path 33 may be varied. Since the ground path 33 is made of fibers, abrasion due to friction with the shaft that rotates hardly occurs. Therefore, the ground path 33 has a longer lifespan than the oil seal.

Figure 3:
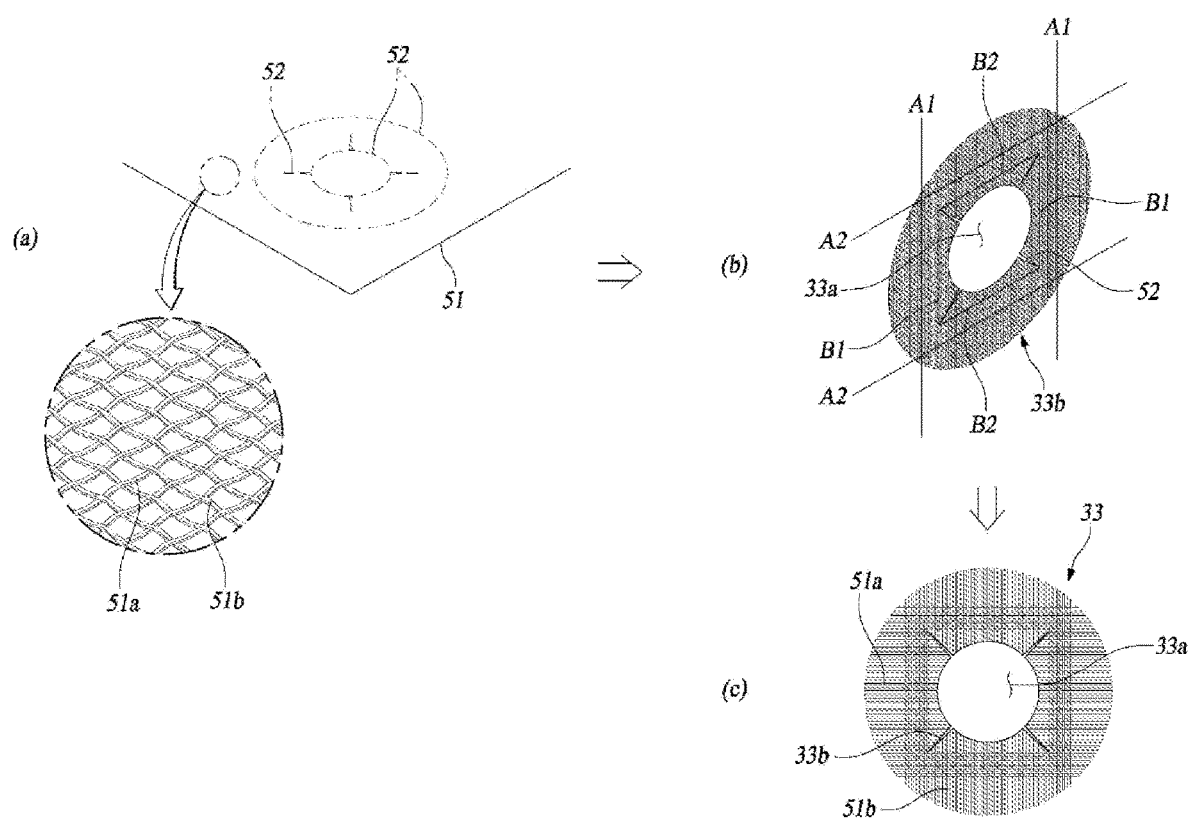
FIG. 3 is a view for explaining a principle of manufacturing a ground path applied to the composite oil seal having an electric corrosion prevention function according to an embodiment of the present invention.

As shown in FIG. 3, (c), the ground path 33 has a shape of a disc having a shaft hole 33a formed in the center thereof. The shaft hole 33a is a hole through which the shaft 15 passes. The inner diameter of the shaft hole 33a is smaller than the diameter of the shaft 15, and the outer periphery of the ground path 33 is in contact with the inner circumferential surface of an opening 11a formed in the motor housing 11.

FIG. 3 is a view for explaining a principle of manufacturing the ground path 33 applied to the composite oil seal having an electric corrosion prevention function according to an embodiment of the present invention. Specifically, FIG. 3 shows a method of manufacturing the ground path 33 using a woven fabric. A carbon fiber fabric 51 may be used as the woven fabric, or a polyester yarn or an aramid yarn coated with silver (Ag) on the surface thereof may be used.

As shown in FIG. 3, (a), the carbon fiber fabric 51 is a fabric formed by weaving a plurality of weft threads 51a and a plurality of warp threads 51b, and is electrically conductive. A general carbon fiber fabric may be used for the present invention; however, the thickness thereof may be varied.

First, the prepared carbon fiber fabric 51 is cut along cutting lines 52. The sizes of the cutting lines 52 are set based on the diameters of the shaft 15 and the opening 11a in the motor 10 to which the ground path 33 is to be applied. Through the above cutting process, a disc-shaped member having the shape shown in FIG. 3, (b) is obtained.

As shown in FIG. 3, (b), the shaft hole 33a and incision lines 33b are formed in the disc-shaped member. The shaft hole 33a is a hole through which the shaft 15 passes, and has a smaller inner diameter than the diameter of the shaft. In addition, the incision lines 33b are cuts formed at four points on the circumference of the shaft hole 33a. When the shaft 15 is inserted into the shaft hole 33a, the incision lines 33b are widened, and the peripheral portion of the shaft hole 33a in the ground path 33 is bent in one direction.

After the disc-shaped member is obtained, some of the weft threads 51a and some of the warp threads are removed. In detail, the warp threads located outside lines A1 in the horizontal direction are removed, and the weft threads located outside lines A2 in the vertical direction are removed. In addition, the warp threads located inside lines B1 in the horizontal direction are removed, and the weft threads located inside lines B2 in the vertical direction are removed. Through the above process, the ground path 33 shown in FIG. 3, (c) is obtained.

Referring to FIG. 3, (c), since the inner portion and the outer portion of the ground path 33 are made of the weft threads and the warp threads, smooth contact between the ground path and the shaft is possible, and therefore there is no friction loss.

Figure 4:
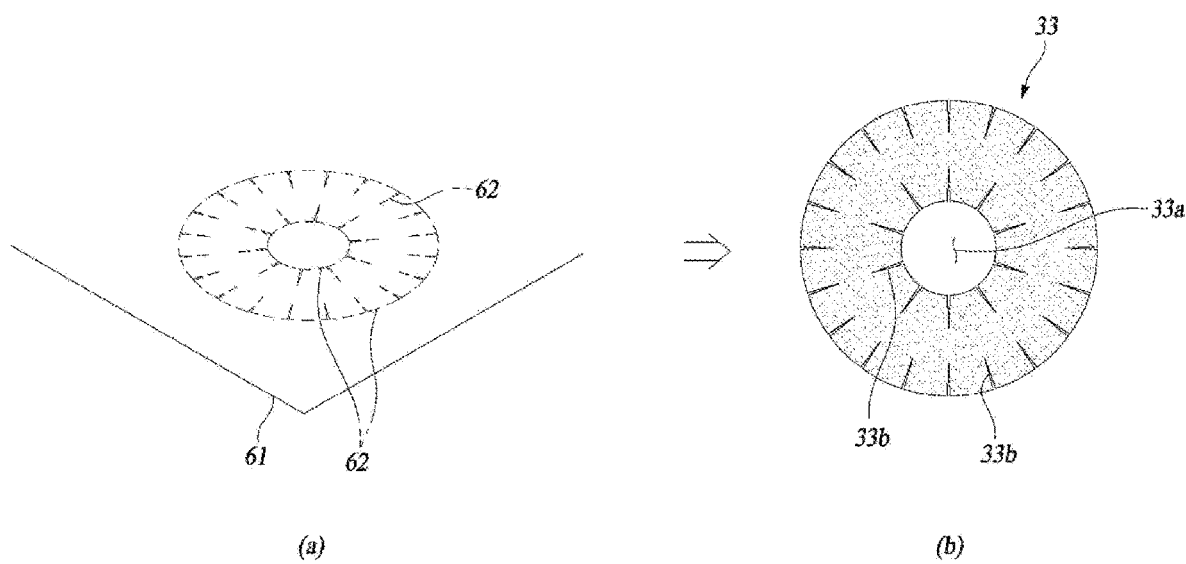
FIG. 4 is a view for explaining a principle of manufacturing another example of the ground path applied to the composite oil seal having an electric corrosion prevention function according to an embodiment of the present invention.

FIG. 4 is a view for explaining a principle of manufacturing another example of the ground path 33 applied to the composite oil seal having an electric corrosion prevention function according to an embodiment of the present invention.

In the case of FIG. 4, a conductive non-woven fabric sheet 61 is used as a material of the ground path 33. The conductive non-woven fabric sheet 61 is a non-woven fabric impregnated with a conductive material. Nickel, copper, silver, aluminum, or gold may be selectively used as the conductive material. The conductive non-woven fabric sheet 61 is conductive due to the above conductive material. Accordingly, it is possible to immediately transmit electricity remaining in the shaft 15 to the motor housing 11.

As shown in FIG. 4, (a), the prepared conductive non-woven fabric sheet 61 is cut along cutting lines 62. FIG. 4, (b) is a front view of a ground path 33 manufactured through the above cutting process. As shown in the drawings, the ground path 33 has a plurality of incision lines 33b formed in the inner portion and the outer portion thereof. The incision lines 33b function to ensure stable connection of the ground path 33 to the shaft 15 and the motor housing 11.

Figure 5:
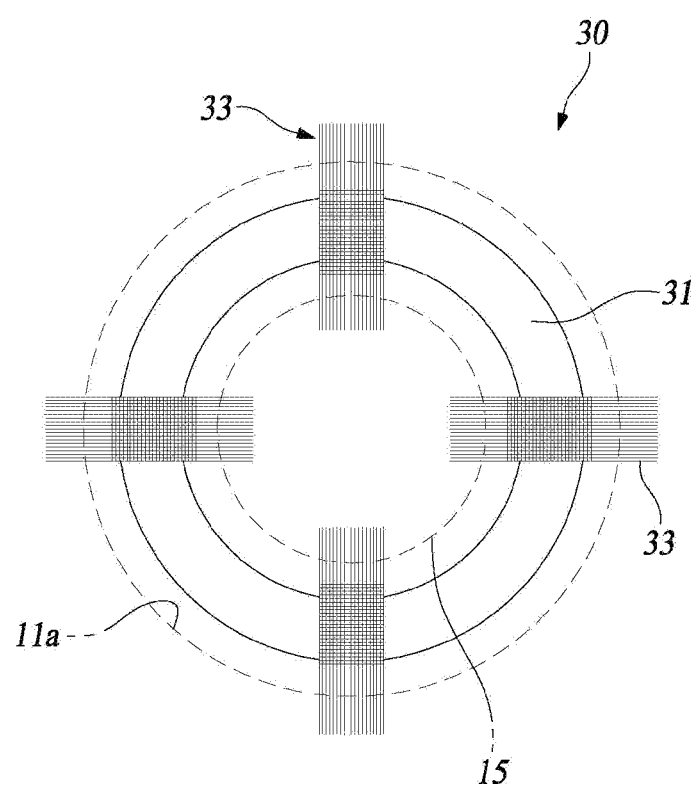
FIG. 5 is a view showing a modified example of the ground path according to an embodiment of the present invention.

FIG. 5 is a view showing a modified example of the ground path according to an embodiment of the present invention.

Referring to FIG. 5, four ground paths 33 are fixed to the seal main body 31. Each of the ground paths 33 has a strap shape. Each of the ground paths 33 is mounted such that substantially the central portion thereof is fixed to the seal main body 31, one end thereof is in contact with the shaft 15, and the other end thereof is in contact with the opening 11a in the motor housing. The strap-shaped ground path 33 is made of a carbon fiber fabric 51 or a conductive non-woven fabric sheet 61.

Figure 6:
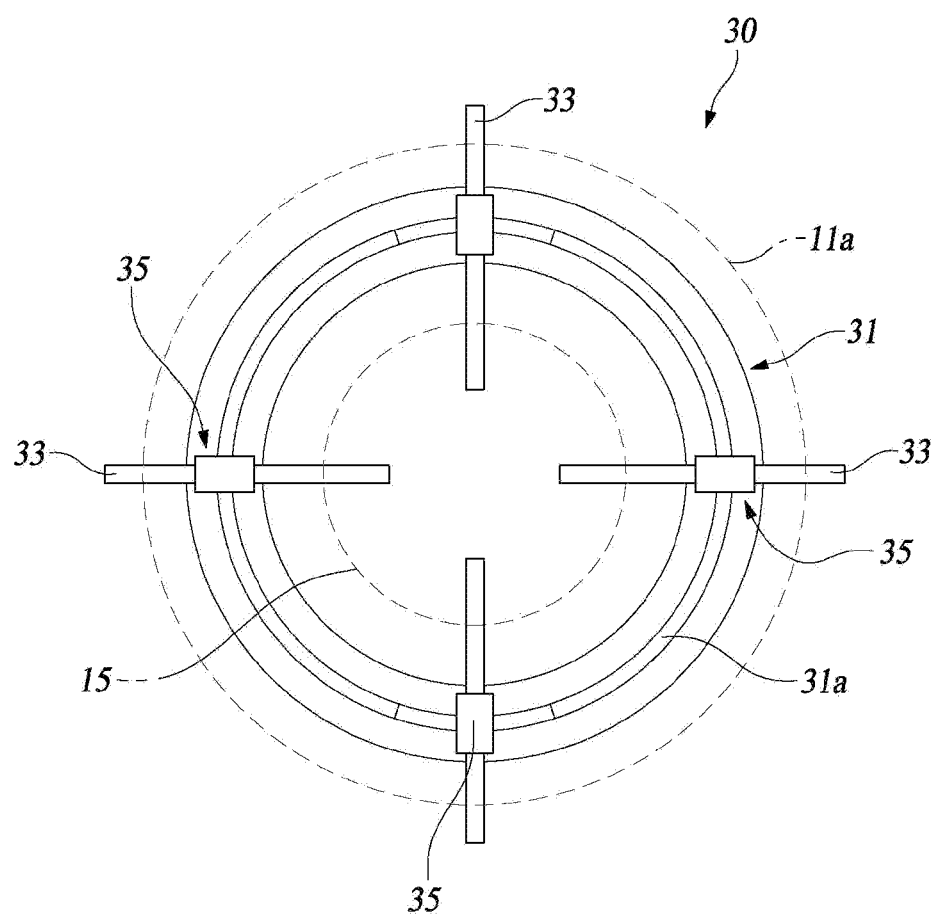
FIG. 6 is a view showing another modified example of the composite oil seal according to an embodiment of the present invention.
Figure 7:
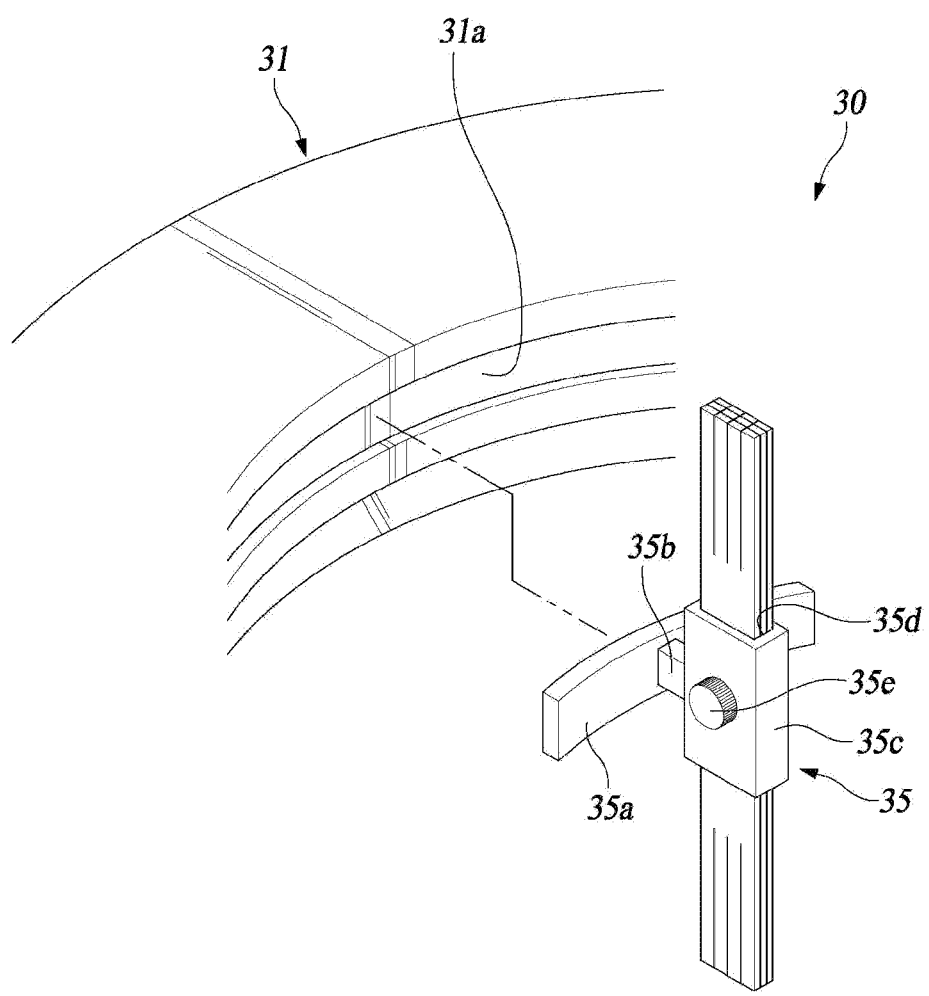
FIG. 7 is an exploded perspective view of a part of the composite oil seal shown in FIG. 6.
Figure 8:
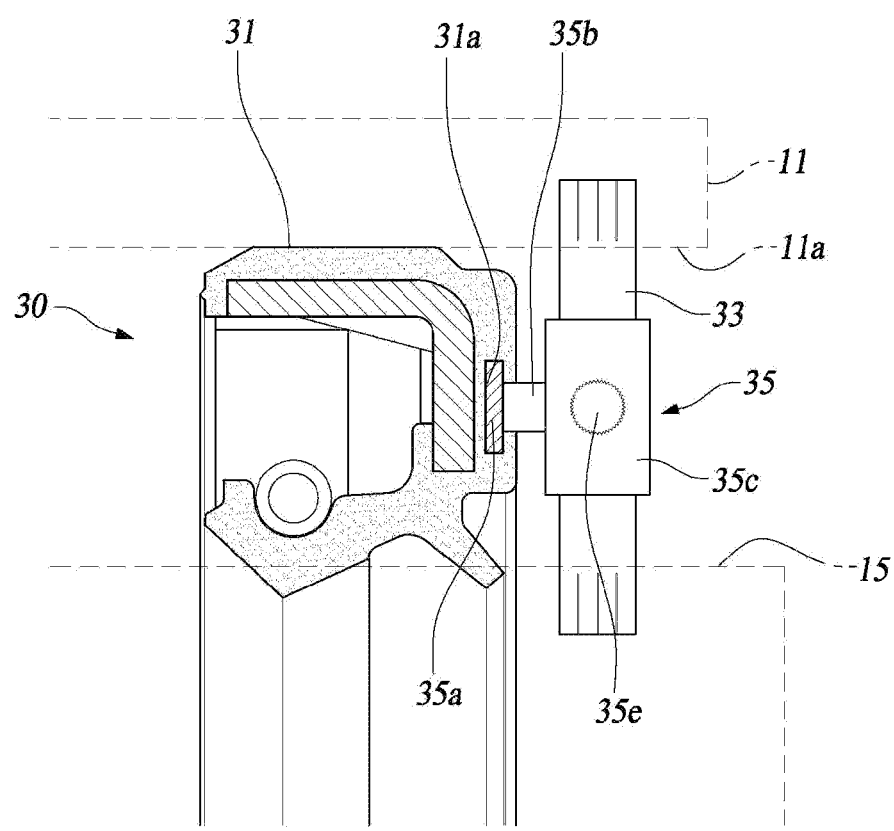
FIG. 8 is a cross-sectional view for explaining a method of mounting a path holder shown in FIG. 7.

FIG. 6 is a view showing another modified example of the composite oil seal 30 according to an embodiment of the present invention, and FIG. 7 is an exploded perspective view of a part of the composite oil seal shown in FIG. 6. FIG. 8 is a cross-sectional view for explaining a method of mounting a path holder shown in FIG. 7.

As shown in the drawings, the seal main body 31 has a mounting groove 31a formed in the outer side surface thereof, and a path holder 35 may be detachably mounted in the mounting groove 31a. The path holder 35 is a support structure for fixing the ground path 33 to the seal main body 31 in a detachable manner, and includes a support 35a, an arm 35b, a support case 35c, and a fixing screw 35e.

The support 35a is an arc-shaped member having the same curvature as the mounting groove 31a. The support 35a has a belt shape, and is detachably fitted into the mounting groove 31a. The support 35a is made of an elastically deformable material so as to be fitted into the mounting groove 31a. The length of the support 35a in the arc direction may be varied.

The arm 35b is a member that is formed integrally with the support 35a and extends in a direction away from the seal main body 31. The length of the arm 35b may be varied. For example, the lengths of the arms of the four path holders 35 shown in FIG. 6 may be different from each other.

The support case 35c is a rectangular frame having a hollow formed therethrough in a vertical direction. The support case 35c is integrally formed with an extended end of the arm 35b to provide an accommodation space 35d. The accommodation space 35d is a space accommodating the ground path 33. In addition, the fixing screw 35e presses the ground path 33 fitted into the support case 35c so that the ground path 33 is maintained in the state of being fixed to the support case 35c. The ground path 33 may be removed by loosening the fixing screw 35e.

The ground path 33 is made of a carbon fiber fabric 51 or a conductive non-woven fabric sheet 61. The upper end of the ground path 33 is in contact with the opening 11a in the motor housing, and the lower end thereof is in contact with the shaft 15. When the above-described path holder 35 is used, the shape of the ground path 33 may be changed more variously, so long as the ground path 33 is capable of electrically connecting the shaft 15 to the motor housing 11. In addition, a plurality of ground paths 33 may be mounted in the state of being stacked one above another.

Figure 9:
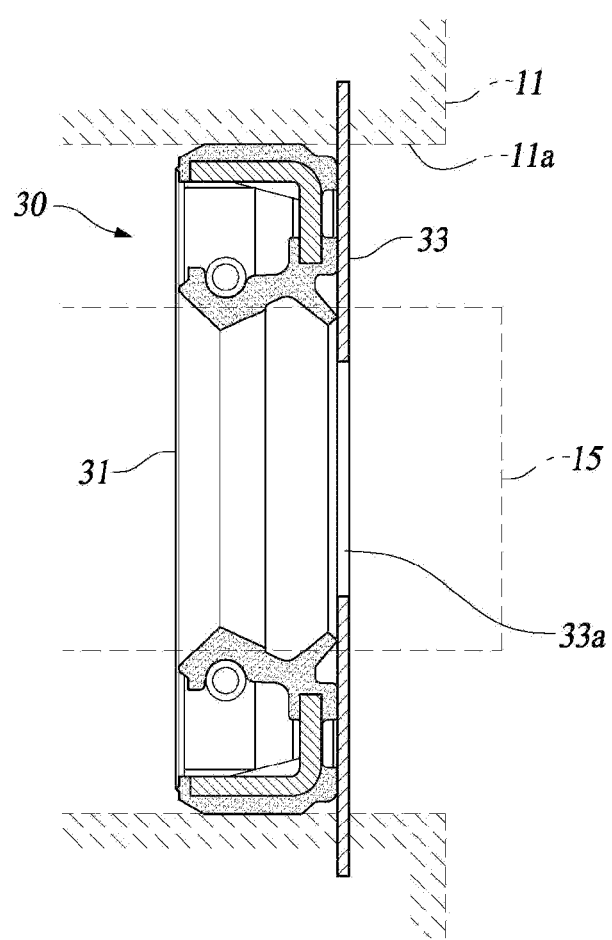
FIG. 9 is a cross-sectional view of a composite oil seal according to another embodiment of the present invention.
Figure 10:
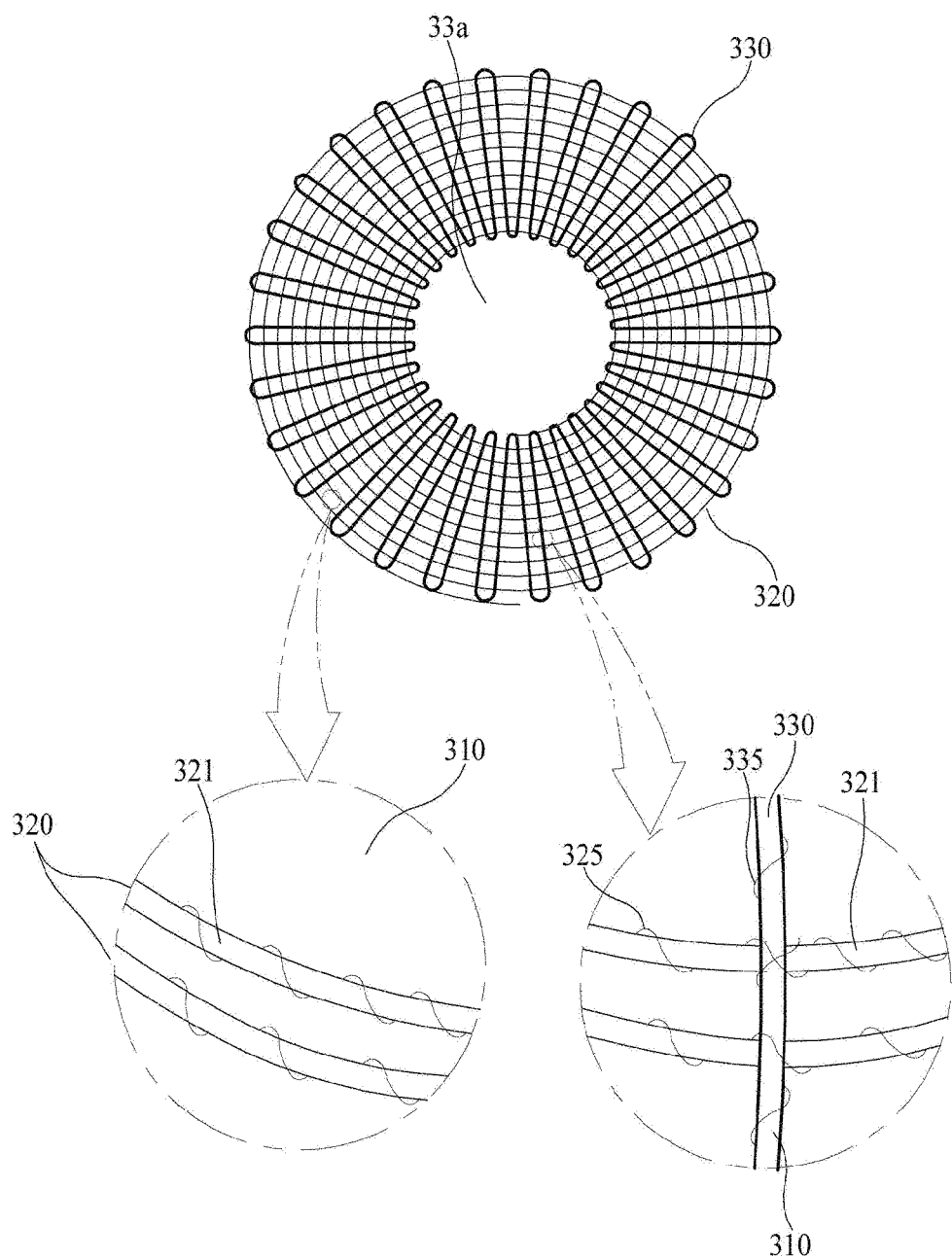
FIG. 10 is a view showing a ground path of the composite oil seal shown in FIG. 9.

FIG. 9 is a view showing a composite oil seal 300 having an electric corrosion prevention function according to another embodiment of the present invention, and FIG. 10 is a view showing a ground path 303 of the composite oil seal 300 shown in FIG. 9.

As shown in FIGS. 9 and 10, a shaft 15 is mounted in a motor housing 11 constituting the motor 10. The shaft 15 rotates in the state of being supported by a bearing 13 and transmits rotational torque to a reducer 20. One end portion of the shaft 15 extends so as to be exposed to the outside of the motor housing 11. In addition, the composite oil seal 300 is located beside the bearing 13.

The ground path 303 includes conductive layers 320 and 330 in which conductive threads 321 and 331 are patterned. The conductive threads 321 and 331 have a yarn shape and are made of a conductive material. The conductive material is a flexible and electrically conductive material such as carbon fiber, graphene, or carbon nanotube. Of course, various conductive fibers other than the above-mentioned materials may be used.

The conductive layers include a first conductive layer 320 and a second conductive layer 330.

The first conductive layer 320 is formed such that the first conductive thread 321 is wound in a circumferential direction about the center of the seal main body 31. The second conductive layer 330 is formed so as to intersect the first conductive thread 321 in a radial direction about the center of the seal main body 31.

The first conductive layer 320 and the second conductive layer 330 are fixed so as to be in contact with each other. In this case, the first conductive layer 320 and the second conductive layer 330 are fixed to a fixing sheet 310, and the fixing sheet 310 is attached to the seal main body, whereby the ground path 303 is fixed to the oil seal.

Figure 11:
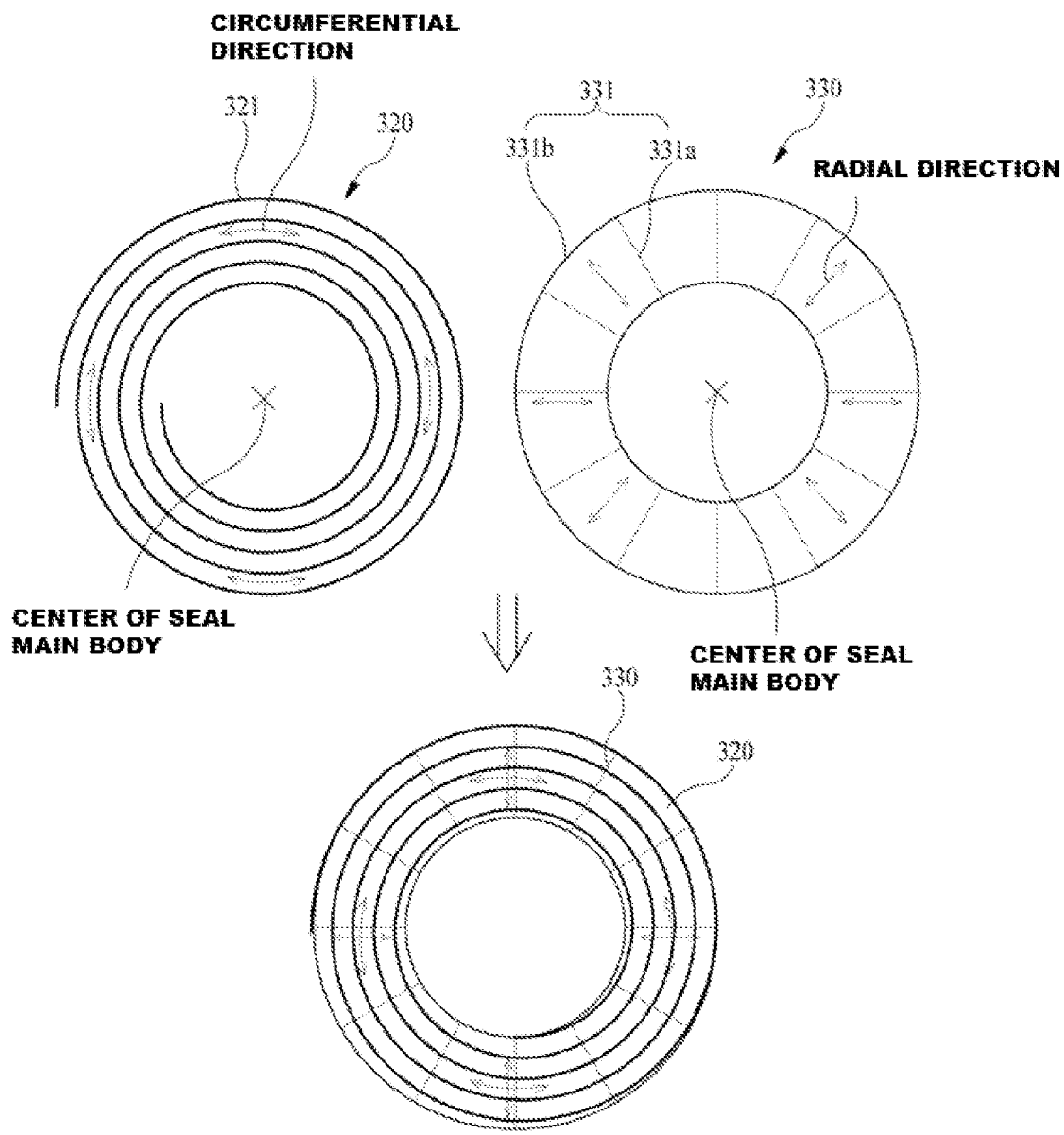
FIG. 11 is a conceptual diagram schematically showing operation of a first conductive layer and a second conductive layer shown in FIG. 10.

As shown in FIG. 11, since the first conductive layer 320 is wound in the circumferential direction about the center of the seal main body 31, the ground path has an increased area of contact with the shaft when attached to the seal main body. In addition, elongation of the ground path in the circumferential direction about the center of the seal main body 31 is increased.

Since the second conductive layer 330 is wound in the radial direction about the center of the seal main body 31, the ground path has increased elongation in the radial direction when attached to the seal main body 31. Accordingly, when the shaft rotates in the state of being in contact with the ground path, the ground path is flexibly bent due to elastic force in the radial direction, and therefore the contact area between the shaft and the ground path is maintained.

If the ground path 303 is composed only of the first conductive layer 320, the elastic force thereof in the radial direction about the center of the seal main body 31 is not large. Therefore, there is the possibility that the durability of the ground path becomes poor and the electrical resistance thereof increases when the shaft rotates relative thereto. In order to solve this problem, the present invention is configured such that the second conductive layer 330 is provided so as to intersect the first conductive layer 320 and to be coupled to the fixing sheet 310, whereby the ground path has elastic force in the radial direction.

Each of the first conductive thread 321 and the second conductive thread 331 may have a diameter of 0.1 to 2 mm. Each of the first conductive thread 321 and the second conductive thread 331 may be formed by combining a plurality of conductive thread filaments 321a having small diameters. The diameter of the conductive thread may be adjusted by adjusting the number of conductive thread filaments constituting the conductive thread. As a result, it is possible to adjust the electrical conductivity of the ground path.

In this case, the conductive threads 321 and 331 may be fixed to the fixing sheet 310 through a sewing process using fixing threads 325 and 335. The sewing process may be performed by a general sewing machine, an embroidery machine used for industrial purposes, or the like; however, the invention is not limited thereto. Any of various other types of machines may be used for the sewing process of the present invention, so long as the same is capable of performing embroidery using upper threads and lower threads.

The fixing threads 325 and 335 are formed in the same pattern as the conductive threads 321 and 331 to fix the conductive threads 321 and 331 to the fixing sheet 310. The fixing threads are preferably made of a conductive material. Specifically, the fixing threads may be made of the same material as the conductive threads. The fixing threads 325 and 335 may be patterned together with the conductive threads through the sewing process. That is, when the conductive threads 321 and 331 are lower threads in the sewing machine, the fixing threads 325 and 335 are upper threads. Alternatively, when the conductive threads 321 and 331 are upper threads in the sewing machine, the fixing threads 325 and 335 are lower threads.

The fixing threads 325 and 335 may pass through both sides of the fixing sheet 310 in a zigzag pattern along the conductive threads so as to be alternately located on one side and the other side of the fixing sheet 310. In this case, portions of the fixing threads cross and press the upper surfaces of the conductive threads, thereby fixing the conductive threads. In detail, the fixing threads 325 and 335 pass through both sides of the fixing sheet 310 in a zigzag pattern so as to be alternately located on one side and the other side of the fixing sheet 310, and portions of the fixing threads that are located on one side of the fixing sheet 310 cross and press the upper surfaces of the conductive threads 321 and 331, thereby fixing the conductive threads 321 and 331.

As one method of fixing the conductive threads 321 and 331, the conductive threads 321 and 331 may be seated on one side of the fixing sheet 310, and may then be fixed to the fixing sheet 310 by stitching the fixing threads 325 and 335 through the fixing sheet 310. Accordingly, the conductive threads are pressed against and tightly fixed to the fixing sheet 310.

When the first conductive layer 320 and the second conductive layer 330 are fixed through the sewing process using the fixing threads, it is preferable that the first conductive layer 320 and the second conductive layer 330 continuously move through a sewing machine. Accordingly, the first conductive layer 320 may be formed in such a manner that the first conductive thread 321 is continuously wound in a spiral shape in the circumferential direction about the center of the seal main body 31, and the second conductive layer 330 may be continuously formed in a wave shape such that two adjacent sections thereof cross the first conductive thread 331 of the first conductive layer 320 in parallel with each other.

The first conductive layer 320 may first be fixed to the fixing sheet 310, and then the second conductive layer 330 may be fixed to the fixing sheet 310 in the state of being stacked on the first conductive layer 320.

Alternatively, the second conductive layer 330 may first be fixed to the fixing sheet 310, and then the first conductive layer 320 may be fixed to the fixing sheet 310 in the state of being stacked on the second conductive layer 330.

The fixing sheet 310 may be made of a material to which the fixing threads 325 and 335 can be stitched. It is preferable for the fixing sheet 310 to be flexible so as to be tightly adhered to the seal main body. The fixing sheet 310 may be a non-woven fabric or a woven fabric. The fixing sheet 310 may be conductive. Alternatively, the fixing sheet 310 may be coated with a conductive material through a coating process using a conductive spray.

According to the present invention, the durability of the ground path is improved due to the high-density weaving pattern of the upper and lower layers. In addition, the high-density weaving pattern of the upper and lower layers improves electrical conductivity of the ground path. In addition, since the conductive threads are patterned in different directions, elongation of the conductive layers is increased.

In addition, since the first conductive layer and the second conductive layer are respectively coupled to the fixing sheet by the fixing threads and the first conductive thread and the second conductive thread are fixed in the state of being entangled with each other, the conductive threads constituting the conductive layers are not easily separated, whereby the durability of the ground path is improved.

FIGS. 12A to 12D are views showing steps of a method of manufacturing the ground path 303 of the composite oil seal having an electric corrosion prevention function according to a preferred embodiment of the present invention.

As shown in FIGS. 12A to 12D, a method of fixing the conductive layers to the fixing sheet 310 of the composite oil seal having an electric corrosion prevention function includes a step of loading the fixing thread on the sewing machine as one of an upper thread and a lower thread, a step of sewing the first conductive thread 321 and the first fixing thread 325 to the fixing sheet 310 using the sewing machine to form the first conductive layer 320, and a step of sewing the second conductive thread 331 and the second fixing thread 335 to the fixing sheet 310 using the sewing machine to form the second conductive layer 330.

Hereinafter, for convenience of explanation, the following description will be given on the assumption that the first conductive layer 320 is first fixed to the fixing sheet 310 and then the second conductive layer 330 is fixed to the fixing sheet 310 in the state of being stacked on the first conductive layer 320. Of course, the following description may also be applied to the case in which the second conductive layer 330 is first fixed to the fixing sheet 310 and then the first conductive layer 320 is fixed to the fixing sheet 310 in the state of being stacked on the second conductive layer 330.

Figure 12A:
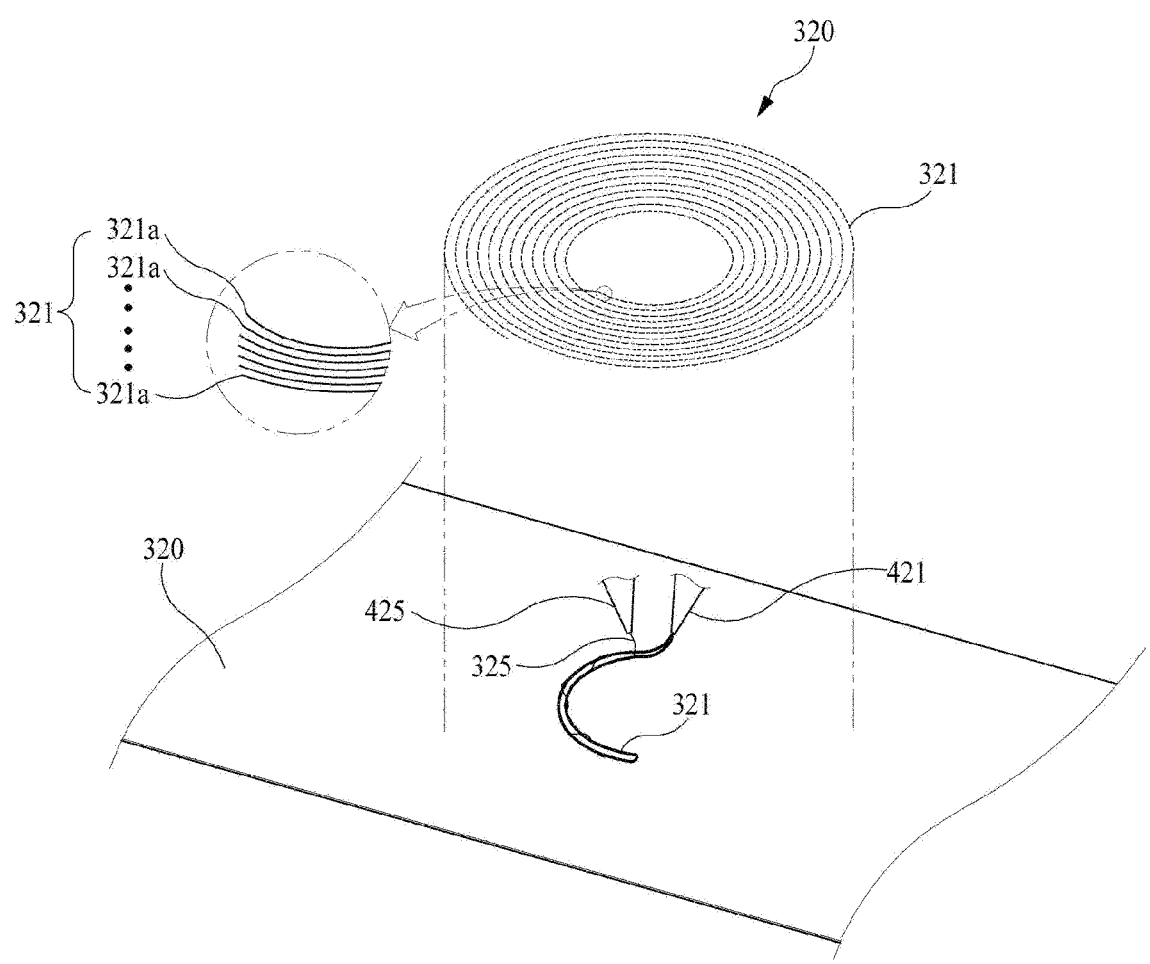
FIGS. 12A to 12D are cross-sectional views showing steps of a method of manufacturing the ground path shown in FIG. 6.

Each step will be described below in more detail. First, as shown in FIG. 12A, a step of fixing the first conductive layer 320 to the fixing sheet 310 is included. To this end, an upper thread and a lower thread are supplied to the sewing machine. For convenience of explanation, the following description will be given on the assumption that the first conductive thread 321 is supplied to the sewing machine as the upper thread through a first upper thread supply nozzle 421 and the first fixing thread 325 is supplied to the sewing machine as the lower thread through a first lower thread supply nozzle 425. The first conductive thread 321 may be formed by combining a plurality of conductive thread filaments 321a. In this step, the first conductive thread 321 is fixed to the fixing sheet by stitching the first fixing thread 325 through the fixing sheet.

The first conductive layer 320 is fixed in such a manner that the first conductive thread 321 is wound in the circumferential direction about the center of the seal main body 31. Accordingly, the first conductive thread 321 may be continuously sewn, and therefore elongation thereof in the circumferential direction may be increased.

Figure 12B:
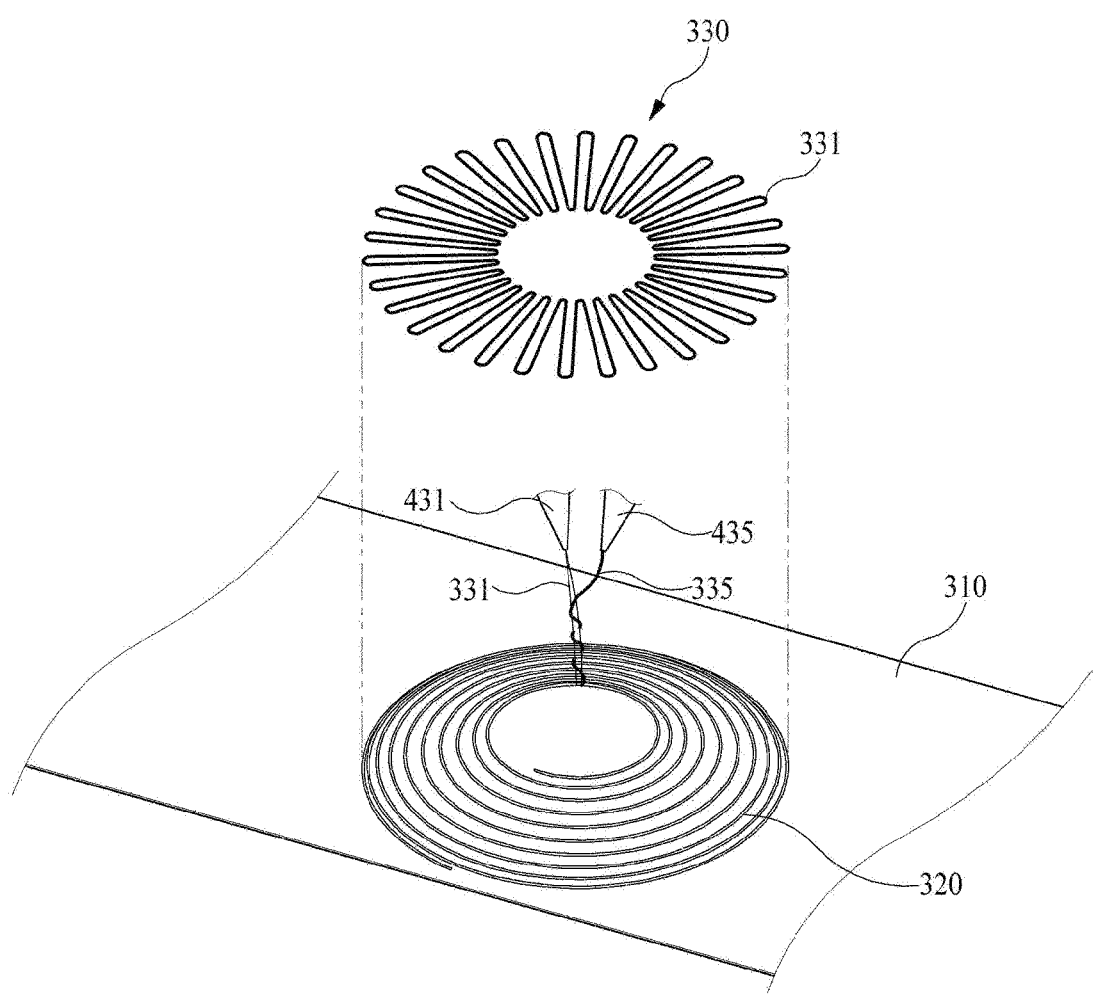

Thereafter, as shown in FIG. 12B, a step of fixing the second conductive layer 330 to the fixing sheet 310 having the first conductive layer 320 fixed thereto is included. To this end, an upper thread and a lower thread are supplied to the sewing machine. For convenience of explanation, the following description will be given on the assumption that the second conductive thread 331 is supplied to the sewing machine as the upper thread through a second upper thread supply nozzle 431 and the second fixing thread 335 is supplied to the sewing machine as the lower thread through a second lower thread supply nozzle 435. The second conductive thread 331 may also be formed by combining a plurality of conductive thread filaments. In this step, the second conductive thread 331 is fixed to the fixing sheet by stitching the second fixing thread 335 through the fixing sheet.

Accordingly, the first conductive thread 321 of the first conductive layer 320 is fixed to the fixing sheet by the second fixing thread 335, and the first conductive thread of the first conductive layer is fixed to the fixing sheet by the second fixing thread as well as the first fixing thread, whereby it is possible to prevent separation of the conductive threads of the conductive layers, leading to improvement in durability.

The second conductive layer 330 is fixed in such a manner that the second conductive thread 331 is wound in the radial direction about the center of the seal main body 31. In this case, the second conductive thread 331 may include radial thread portions 331a, which extend in a direction intersecting the extension direction of the first conductive thread 321 and are arranged parallel to each other in the state of being spaced apart from each other, and a connecting thread portion 331b, which interconnects the radial thread portions 331a. Accordingly, the second conductive thread 331 may be continuously sewn in a wave shape, and therefore elongation thereof in the radial direction may be increased.

Figure 12C:
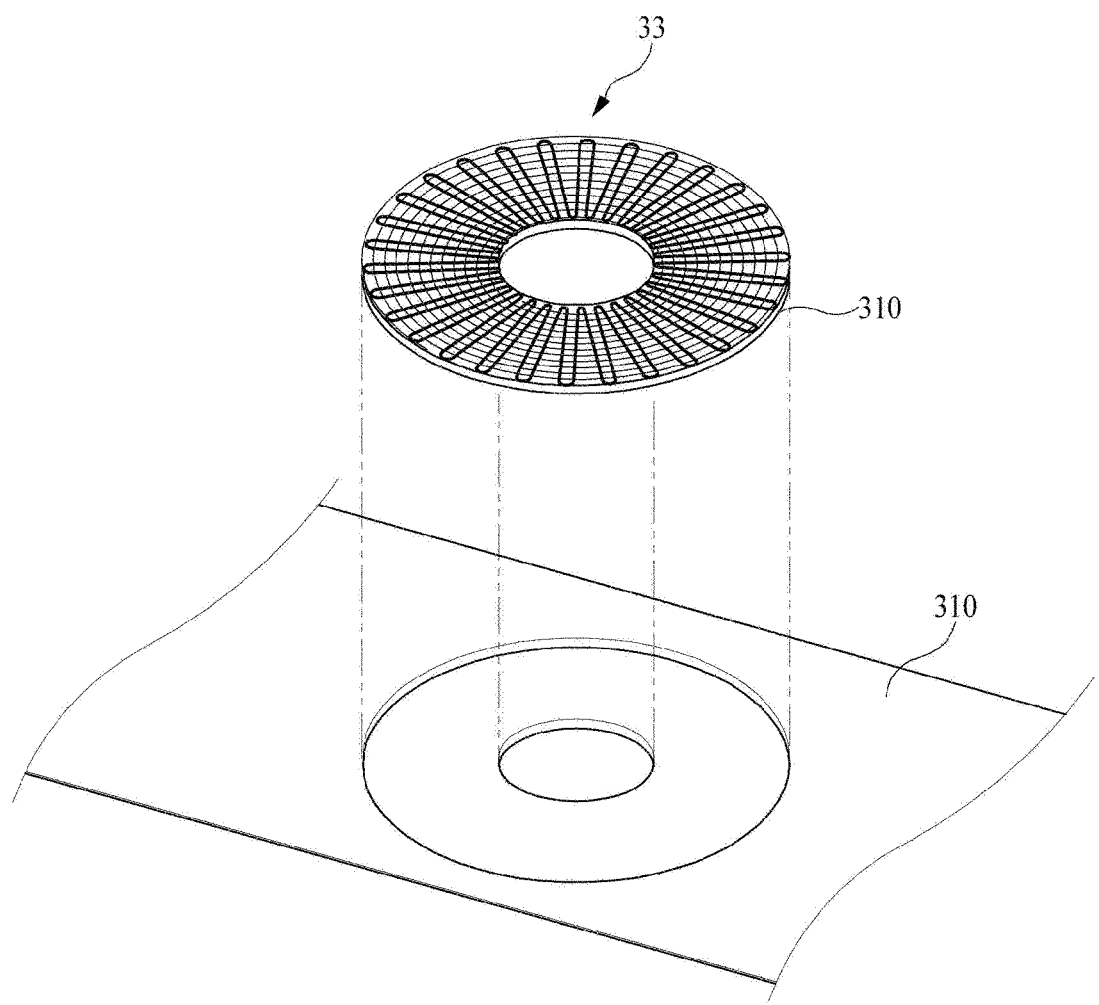
Figure 12D:
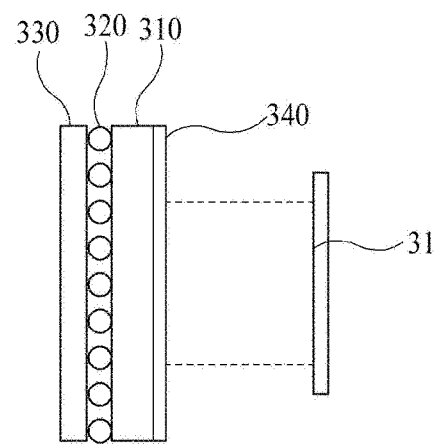
Figure 12D:
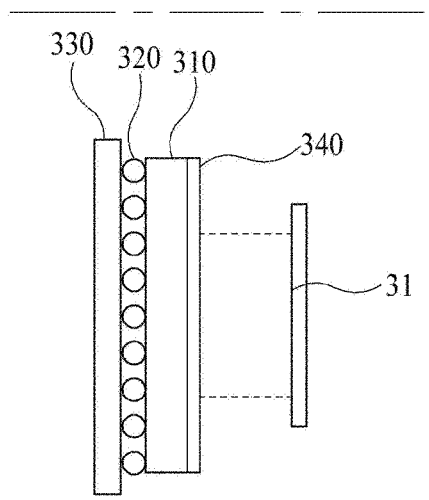

Thereafter, as shown in FIG. 12C, the ground path 303 is cut out from the fixing sheet 310, and then, as shown in FIG. 12D, a step of attaching the ground path 303 to the seal main body is performed.

In this case, a double-sided adhesive member 340 may be provided on the rear surface of the fixing sheet 310, and the ground path 303 may be attached to the seal main body 31 due to the double-sided adhesive member 340.

Alternatively, the ground path 303 may be attached to the seal main body using a mold, or any of various other attachment methods may be employed.

The fixing sheet 310 may be made of conductive fibers or non-conductive fibers. Any of various other materials may be used for the fixing sheet 310, so long as the same is capable of being sewn by a sewing machine and is flexible. Meanwhile, the fixing sheet may be coated with a conductive spray in order to improve conductivity.

As is apparent from the above description, the composite oil seal having an electric corrosion prevention function of the present invention configured as described above transmits current induced in a shaft to the outside while performing a basic sealing function in the state of being mounted to the shaft, thereby preventing damage to a bearing, preventing electrical defects of a motor, and increasing the lifespan of the motor.

In addition, since the ground path is made of a low-priced fiber material, the ground path may be used semi-permanently, and it may not be necessary to machine a motor housing in order to mount the ground path.

In addition, since elongation of the ground path is increased in both the circumferential direction and the radial direction about the center of the seal main body, the durability and electrical conductivity thereof are increased.

In addition, it is possible to ensure oil sealing and to prevent electric corrosion using the integrated-type oil seal without using a conventional high-priced shaft ground ring (SGR). Accordingly, it is economical.

In addition, since it is not necessary to mount the shaft ground ring (SGR), the size of an available space in the motor is increased, the assemblability thereof is improved, and the weight thereof is reduced.

Although specific embodiments of the present invention have been disclosed for illustrative purposes, those skilled in the art will appreciate that various modifications, additions, and substitutions are possible, without departing from the scope and spirit of the invention as disclosed in the accompanying claims.

The present invention is applicable to systems in which a driving motor and a bearing configured to be rotated by the driving motor are mounted, such as electric vehicles or hybrid vehicles.

What is claimed is:

1. A composite oil seal having an electric corrosion prevention function, the composite oil seal comprising:
    a seal main body configured to seal an interior of a motor housing in a state of being mounted to a shaft in the motor housing;
    a ground path mounted to the seal main body, the ground path being configured to electrically connect the shaft to the motor housing to allow current induced in the shaft to flow to the motor housing; and
    a support member configured to detachably fix the ground path to the seal main body,
    wherein the seal main body has a mounting groove formed therein, and
    wherein the support member comprises:
    a support detachably mounted in the mounting groove;
    an arm fixed to the support; and
    a support case located at an end of the arm to accommodate and support the ground path.

2. A composite oil seal having an electric corrosion prevention function, the composite oil seal comprising:
    a seal main body configured to seal an interior of a motor housing in a state of being mounted to a shaft in the motor housing; and
    a ground path mounted to the seal main body, the ground path being configured to electrically connect the shaft to the motor housing to allow current induced in the shaft to flow to the motor housing,
    wherein the ground path comprises a conductive layer in which a conductive thread having a yarn shape and made of a conductive material is patterned,
    wherein the conductive layer comprises at least two conductive layers stacked one above another, and
    wherein the at least two conductive layers comprise:
    a first conductive layer formed in such a manner that a first conductive thread is wound in a circumferential direction about a center of the seal main body; and
    a second conductive layer formed in such a manner that a second conductive thread extends in a radial direction about the center of the seal main body so as to intersect the first conductive thread, the second conductive layer being in contact with the first conductive layer.

3. The composite oil seal according to claim 2, wherein the ground path further comprises:
    a fixing sheet configured to be adhered to the seal main body; and
    a fixing thread fixing the conductive layer to the fixing sheet.

4. The composite oil seal according to claim 3, wherein the conductive thread has a diameter of 0.1 to 2 mm, and is used as any one of an upper thread and a lower thread for use in a sewing machine, and
    wherein the fixing thread is formed in a same pattern as the conductive thread, is used as a remaining one of the upper thread and the lower thread for use in the sewing machine, and is sewn together with the conductive thread to fix the conductive thread to the fixing sheet.

5. The composite oil seal according to claim 4, wherein the fixing thread passes through both sides of the fixing sheet along the conductive thread so as to be alternately located on one side and another side of the fixing sheet, and a portion of the fixing thread that is located on the one side of the fixing sheet crosses and presses an upper surface of the conductive thread to fix the conductive thread.

6. The composite oil seal according to claim 3, wherein the fixing sheet is made of a fiber material, and is coated with a conductive spray.

7. The composite oil seal according to claim 2, wherein the first conductive layer is formed in such a manner that the first conductive thread is continuously wound in a spiral shape in the circumferential direction about the center of the seal main body, and
    wherein the second conductive layer is continuously formed in a wave shape such that two adjacent sections thereof cross the first conductive thread of the first conductive layer in parallel with each other.

8. The composite oil seal according to claim 2, wherein the conductive thread is made of a carbon fiber material.

9. A method of manufacturing a ground path of the composite oil seal described in claim 3, the method comprising:
    loading each of a first fixing thread and a second fixing thread on a sewing machine as one of an upper thread and a lower thread;
    sewing the first conductive thread and the first fixing thread to the fixing sheet using the sewing machine to form the first conductive layer and to fix the first conductive layer to the fixing sheet; and
    sewing the second conductive thread and the second fixing thread to the fixing sheet using the sewing machine to form the second conductive layer and to fix the second conductive layer to the fixing sheet.

10. The method according to claim 9, wherein, in the sewing the first conductive thread and the first fixing thread and the sewing the second conductive thread and the second fixing thread, the first conductive thread and the second conductive thread are fixed to the fixing sheet by stitching the first fixing thread and the second fixing thread through the fixing sheet.

11. The method according to claim 10, wherein the sewing the first conductive thread and the first fixing thread comprises:
  stitching the first fixing thread through the fixing sheet to fix the first conductive layer to the fixing sheet while continuously winding the first conductive thread in a spiral shape in the circumferential direction about the center of the seal main body, and
  wherein the sewing the second conductive thread and the second fixing thread comprises:
  stitching the second fixing thread through the fixing sheet to fix the second conductive layer to the fixing sheet while continuously forming the second conductive thread on an upper surface of the first conductive layer in a wave shape in the radial direction about the center of the seal main body such that the second conductive thread crosses the first conductive thread.

* * * * *